United States Patent [19]

Byeseda

[11] Patent Number: 4,624,704
[45] Date of Patent: Nov. 25, 1986

[54] SELECTIVE RECOVERY OF ZINC FROM METAL CONTAINING BRINES

[75] Inventor: John J. Byeseda, Tulsa, Okla.

[73] Assignee: Combustion Engineering, Inc., Windsor, Conn.

[21] Appl. No.: 783,285

[22] Filed: Oct. 2, 1985

[51] Int. Cl.$^4$ ............................................. C22B 19/00
[52] U.S. Cl. .................................. 75/101 BE; 75/108; 75/120; 75/121; 423/92; 423/100; 423/139; 423/157; 423/DIG. 14; 204/112; 204/114; 210/685; 210/688
[58] Field of Search ................ 204/113, 114; 423/100, 423/DIG. 14, 139, 92, 157; 75/101 BE, 120, 121; 210/108, 684, 688, 685

[56] References Cited

U.S. PATENT DOCUMENTS

| 3,446,720 | 5/1969 | Brooks | 204/112 |
| 4,203,964 | 5/1980 | Reinhardt et al. | 423/139 |
| 4,500,498 | 2/1985 | Kruesi et al. | 423/100 |

FOREIGN PATENT DOCUMENTS 1026951 2/1978 Canada .

Primary Examiner—John Doll
Assistant Examiner—Robert L. Stoll
Attorney, Agent, or Firm—William W. Habelt

[57] ABSTRACT

Zinc is extracted from an aqueous zinc containing brine (3) by contacting the brine with an organic reagent (5) consisting essentially of an extracting agent comprising a quaternary amine salt, a phase modifier, and an organic diluent so as to form a zinc amine complex (7) whereby a substantial portion of the zinc ions in the brine is transferred to the organic phase. The quaternary amine salt is a methyl triakyl ammonium chloride herein the alkyl groups contain from 8 to 10 carbon atoms. The zinc amine complex (7) is then contacted with an aqueous strippant (11) comprising a solution of sodium sulfate in water so as to form a sulfated quaternary amine salt whereby a substantial portion of zinc in the zinc amine complex is stripped therefrom and transferred to the aqueous phase as an aqueous zinc chloride solution (13) from which zinc may be recovered by electrowinning or chemical precipitation.

7 Claims, 1 Drawing Figure

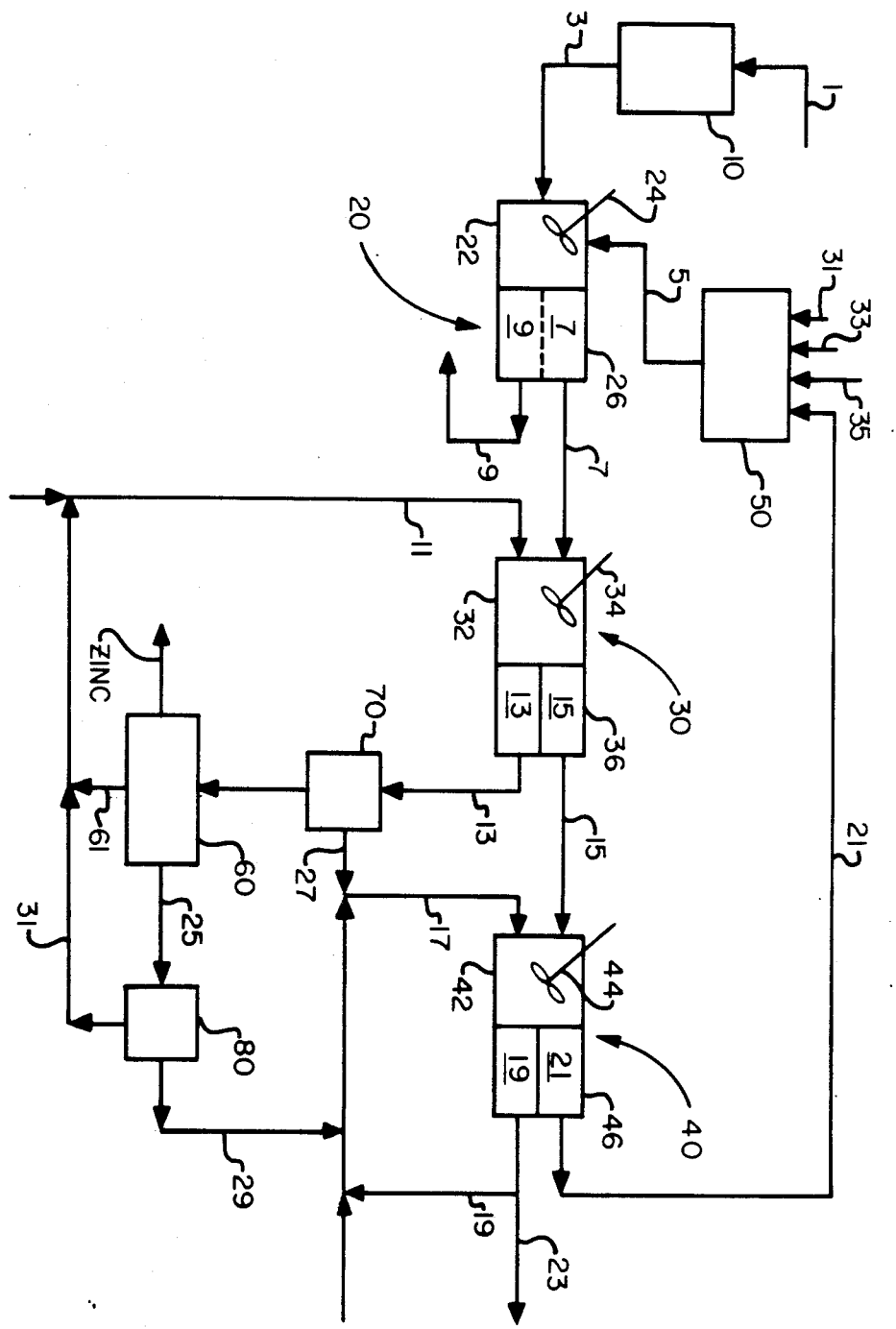

SELECTIVE RECOVERY OF ZINC FROM METAL CONTAINING BRINES

BACKGROUND OF THE INVENTION

The present invention relates generally to the recovery of zinc from solutions of metallic ions and, more particularly, to a process for selectively recovering zinc from brines containing from about 20% to about 25% by weight of dissolved solids including zinc amongst a variety of other metallic ions.

The term "brine" is commonly applied to any aqueous solution that contains a substantial quantity of dissolved metallic solids. One very common type of brine is a waste stream or byproduct stream of an industrial process. Such brines often have substantial quantities of metallic ions which can be of commercial value if recovered, such as magnesium, manganese, zinc, potassium, boron, lithium, lead, copper and silver among others. Another type of brine is that from geothermal sources below the earth's surface. With the increasing use of geothermal energy for the production of electricity, this source of brine is becoming more readily available.

Most geothermal reservoirs consist of hot liquid pools which are maintained at high pressure beneath the earth's surface. When these liquid pools are tapped for geothermal power generation, a fraction of the liquid brine is vaporized in a flash-steam power plant to produce the electricity. The remainder of the brine, which remains a liquid, is often reinjected into the geothermal reservoir. Geothermal brines typically contain numerous dissolved metals in addition to zinc, including sodium, calcium, potassium, iron, manganese, barium, strothium, magnesium, boron, lithium, lead, copper and silver. It would be commercially advantageous to process such geothermal brine prior to reinjection to recover the zinc therefrom.

Various solvent extraction processes are known for recovering zinc from solutions containing zinc in the form of the dissolved ion. For example, Canadian Pat. No. 1,026,951 discloses a two-cycle solvent extraction process for preparing a zinc solution for electrolytic deposition from a solution containing zinc and a high concentration of chloride ions. In the first cycle, zinc is extracted from the solution by means of an organic solution containing an extracting agent selected from an amine or a quaternary ammonium compound of minimum solubility in water and an organic diluent. The zinc is then re-extracted from the organic phase with an aqueous solution to obtain a zinc enriched aqueous solution. A second extraction cycle is then performed wherein the zinc enriched aqueous solution from the first cycle is reacted with an organic acid admixtured with an organic diluent. The zinc is then re-extracted from the organic phase using a strong sulphate acid solution.

Another zinc extraction process is disclosed in U.S. Pat. No. 4,203,964 wherein a kerosene solution of an organic amine or phosphorous compound is used to extract zinc from an acid chloride-bearing aqueous solution. The organic extraction solution is contacted with an aqueous solution of sulfuric acid to transfer metal ions and chloride ions to the aqueous solution. The acidified aqueous solution is then heated to drive off hydrogen chloride in water and recover the zinc as zinc sulfate.

SUMMARY OF THE INVENTION

It is an object of the present invention to provide a method for selectively recovering zinc from an aqueous brine containing a quantity of dissolved metallic ions in addition to the zinc ions.

It is a further object of the present invention to provide such a method for selectively recovering zinc at efficiencies of better than 80%.

In accordance with the present invention, the aqueous zinc containing brine is contacted with an organic reagent consisting essentially of an extracting agent comprising a quaternary amine salt, a phase modifier, and an organic diluent so as to form a zinc amine complex whereby a substantial portion of the zinc ions in the brine are selectively extracted therefrom and transferred to the organic phase. The quaternary amine salt is a methyl triakyl ammonium chloride wherein the alkyl groups contain from 8 to 10 carbon atoms. The zinc amine complex is then contacted with an aqueous strippant comprising a solution of sodium sulfate in water so as to form a sulfated quaternary amine salt whereby a substantial portion of zinc in the zinc amine complex is stripped therefrom and transferred to the aqueous phase as an aqueous zinc chloride solution. The organic phase sulfated quaternary ammonium salt may then be separated from the aqueous zinc chloride solution and the zinc recovered from the aqueous chloride solution by electrowinning or chemical precipitation.

BRIEF DESCRIPTION OF THE DRAWING

The method of the present invention will be further explained and illustrated hereinafter with reference to the accompanying drawing wherein the sole FIGURE thereof is a schematic diagram illustrating a process for recovering zinc from a brine in accordance with the present invention.

DESCRIPTION OF A PREFERRED EMBODIMENT

Referring now to the drawing, there is depicted therein a plant for recovering zinc from an aqueous solution, termed "brine" which contains a substantial quantity of dissolved metal ions including zinc. The raw brine, such as but not limited to that derived fom geothermal wells, typically contains numerous dissolved metallic ions in addition to zinc, including for example: sodium, potassium, calcium, iron, manganese, barium, strontium, magnesium, boron, lithium, lead, copper and silver.

The raw brine 1 is first passed through a filtering apparatus 10, such as a media bed filter, wherein the brine is coarse filtered to remove suspended solids therefrom to produce a filtered brine containing dissolved solids but relatively free of suspended solids thereby avoiding contamination of the downstream extracting, stripping and recovering vessels. The filtered brine 3 is passed to an extraction unit 0 which, as in the embodiment shown in the drawing, may comprise a single mixer/settler vessel of conventional type having a mixing chamber 22 and a settling chamber 26. The filtered brine 3 enters the mixing chamber 22 of the extraction unit 20 and is contacted therein with an organic extraction solution 5 supplied from preparation tank 50. The mixing chamber 22 is provided with an agitator 24 which stirs the contents of the mixing chamber 22 to thoroughly mix the aqueous brine 3 and the organic extraction solution 5.

After mixing, typically for a residence time of about 5 minutes, the aqueous brine and organic extraction solution mixture are passed to the settling chamber 26 wherein the mixture is allowed to settle, typically for a residence time of about 15 minutes, to permit the organic phase and aqueous phase to separate from each other with the organic phase 7 floating atop the liquid phase 9. The liquid phase 9 comprises a zinc deficient brine which may be passed to waste or, in the case of geothermal wells, reinjected into the well. The organic phase 7 comprises a zinc amine compound, having the general formula $(R_4N)_2ZnCl_4$ wherein the zinc chloride complex is in turn complexed with the two quaternary amine radicals.

The organic phase zinc amine solution is passed from the extraction unit 20 to the stripping unit 30 which, as in the embodiment shown in the drawing, may comprise a single mixer/settler vessel of conventional type having a mixing chamber 32 and a settling chamber 26. The organic phase zinc amine compound 7 enters the mixing chamber 32 of the extraction unit 30 and is contacted therein with an aqueous sodium sulphate stripping solution 11. The mixing chamber 32 is also provided with an agitator 34 which stirs the contents of the mixing chamber to thoroughly mix the organic phase zinc amine complex 7 and the sodium sulfate stripping solution 11. After mixing, typically for a residence time of about 5 minutes, the mixture of organic phase zinc amine complex and sodium sulfate solution is passed to the settling chamber 36 of the stripping unit 30.

In the settling chamber 36, the mixture is allowed to settle for a residence time typically of about 15 minutes to permit the organic phase and the aqueous phase to separate. In the stripping process, the zinc is transferred from the organic phase zinc amine to form an aqueous phase sodium and zinc chloride/sulfate solution 13. The organic phase amine is complexed with sulfate from the stripping solution to form an amine sulfate complex 15. In the settling chamber 36, the organic phase sulfated amine separates from the aqueous phase zinc solution 13 with the organic phase 15 floating above the aqueous phase 13. The aqueous zinc solution 13 is passed from the settling chamber 36 of the stripping vessel 30 to a zinc recovery unit 60 wherein zinc is removed from the solution by any of a number of well known means, preferably electrowinning or chemical precipitation.

The organic phase sulfated amine solution 15 is passed to an amine recovery vessel 40 which, as in the embodiment shown in the drawing, may comprise a single mixer/settler vessel of conventional type having a mixing chamber 42 and a settling chamber 46. The organic phase sulfated amine enters the mixing chamber 42 of the amine recovery unit 40 and is contacted therein with an aqueous solution 17 containing chloride ions, preferably a sodium chloride solution. The mixing chamber 42 is provided with an agitator 44 which stirs the contents of the mixing chamber 42 to thoroughly mix the organic phase sulfated amine and the chloride solution so as to permit interaction therebetween whereby the sulfated amine complex will be transformed back to a quaternary ammonium chloride and the sulfate ions transferred to the aqueous phase. After mixing, again typically for a residence time of about 5 minutes, the mixture is passed to the settling chamber 46 of the recovery unit 40 and allowed to settle therein for a residence time of about 15 minutes to permit separation of the organic phase quaternary ammonium chloride and the aqueous phase sulfate and chloride solution with the organic phase quaternary ammonium chloride solution 21 floating on the aqueous sulfate and chloride solution 19.

Due to an excess of chloride ions the chloride solution 19 is recycled and mixed with makeup sodium chloride to form the aqueous chloride solution 17 which is to be contacted with the sulfated amine in the recovery vessel 40. A purge stream 23 is drawn of the aqueous sulfate and chloride solution 19 prior to recycle in order to maintain the sulfate ion content of the chloride solution 17 passed to the recovery vessel 40 at acceptable levels. If chemical precipitation is used for zinc recovery, the purge stream 23 may be recycled to the stripping vessel 30 and mixed with makeup sodium sulfate to form the sodium sulfate stripping solution 11 admitted to the stripping vessel 30 for stripping the zinc tetrachloride ions from the amine zinc complex, provided the high chloride ion concentration does not become excessive. If electrowinning is used for zinc recovery, the purge stream 23 is not recycled.

In order to reduce consumption of chloride and sulfate in carrying out the process of the present invention, the aqueous phase zinc solution 13, which contains $Zn^{++}$, $Na^+$, $SO_4^=$ and $Cl^-$ ions, may be processed, either before or after zinc recovery, to separate the chloride and sulfate ions. For example, if electrowinning is used for zinc recovery, the aqueous zinc solution 13 from the settling chamber 36 of the stripping vessel 30 may be first processed in separator 70 to remove a substantial portion of the chloride ions therefrom prior to introduction into the zinc recovery unit 60. The high chloride stream 27 separated from the aqueous phase zinc solution 13 in separator 70 would be passed to the amine recovery unit 40 as part of the aqueous chloride solution 17 thereby reducing make-up chloride consumption. The waste stream 61 from the electrowinning process would comprise a predominantly sodium sulfate solution suitable for passing to the stripping vessel 30 as part of the sulfate solution 11 thereby reducing make-up sodium sulfate consumption.

If chemical precipitation is used, for example, via zinc carbonate formation following soda ash addition to the aqueous phase zinc solution in the zinc recovery unit 60, the chloride ions may be separated post zinc recovery. In such case, the sodium sulfate/chloride solution 25 remaining after zinc recovery is passed from the zinc recovery unit 60 to a separator 80 wherein the solution 25 is split into a high chloride ion stream 29 and a high sulfate ion stream 31. The high chloride ion stream 29 would be passed to the amine recovery unit 40 as part of the aqueous chloride solution 17 thereby reducing make-up chloride consumption, while the high sulfate ion stream 31 would be passed to the stripping vessel 30 as part of the sulfate solution 11 thereby reducing make-up sodium sulfate consumption.

The organic extraction solution 5 contacted with the filtered brine 3 in the extraction vessel 20 consists essentially of a mixture of an extracting agent comprising a quaternary ammonium chloride salt, a phase modifier, and an organic diluent. The organic phase quaternary ammonium chloride solution 21 recovered in the recovery vessel 40 is recycled from the separating chamber 46 thereof back to the preparation tank 50 so as to reduce the addition of makeup chemicals added to the preparation tank 50 to produce the quaternary ammonium chloride solution 5 to be contacted with the filtered brine 3 in the zinc extraction unit 50. The quaternary amine salt which has been found to permit the selective recovery of zinc from a brine containing a substantial quantity of other metallic ions in addition to zinc is a methyl trialkyl ammonium chloride wherein each of the trialkyl groups is a hydrocarbon containing from 8 to 10 carbon atoms. The use of this particular quaternary ammonium salt in conjunction with the sodium sulfate stripping step and the amine recovery step has produced a very economical and extremely efficient process wherein at least 80% of the zinc in the brine is recovered with only small mixture of 9 to 11 chain alcohol marketed by Shell Chemical Company, as a phase modifier, and 80% by volume of Tellura 705, an organic diluent marketed by the Exxon Chemical Company. The synthetic brine was at a temperature of 75° F. when contacted with the various organic reagent solutions at a ratio of organic extracting solution to aqueous brine of 1 to 3. The zinc extraction obtained with each of these extracting agents is presented in Table I below:

TABLE I

METAL EXTRACTION FROM SYNTHETIC BRINE AT 3:1 AQUEOUS/ORGANIC RATIO AND 75° F.

| Extractant (10 v %) | % Extraction | | | | | | | | | | Equilibrium pH |
|---|---|---|---|---|---|---|---|---|---|---|---|
|  | Na | Ca | K | Mn | Zn | Sr | Li | Ba | Pb | Mg |  |
| Napthenic Acid | 0 | 9.5 | 1.9 | 0 | 0 | 10.3 | 0 | 0 | 0 | 0 | 3.97 |
| Neo-decanoic Acid | 0 | 5.1 | 3.1 | 0 | 0 | 7.8 | 0 | 0 | 0 | 0 | 4.04 |
| Neo-pentanoic Acid | 2.0 | 7.9 | 0 | 0 | 0 | 0 | 0 | 0 | 0 | 0 | 2.85 |
| Tertiary Amine (Adogen 383) | 2.6 | 7.5 | 0 | 5.2 | 51.9 | 0 | 5.2 | 0 | 0 | 0 | 2.59 |
| Quarternary Amine (Adogen 464) | 2.4 | 8.7 | 1.2 | 0 | 97.6 | 0 | 2.8 | 4.6 | 8.9 | 0 | 3.85 |
| DBBP | 7.7 | 6.3 | 0 | 8.6 | 1.6 | 0 | 0 | 0 | 0 | 0 | 2.84 |
| Kelex 100[1] | 4.8 | 7.1 | 9.3 | 0 | 2.1 | 2.6 | 0 | 0 | 0 | 0 | 4.33 |
| Blank | 0 | 4.7 | 0 | 0 | 0 | 0 | 0 | 0 | 0 | 0 | 5.35 |
| Absolute Precision | ±1% | ±3% | ±1% | ±1% | ±0.5% | ±2% | ±1% | ±4% | ±4% | ±1% |  |

[1] Keloex 100 is a substituted 8-hydroxyquinoline marketed by the Sherex Chemical Company.

amounts of additional metals being recovered in addition to the zinc. Therefore, a relatively pure zinc solution suitable for electrowinning or chemical precipitation can be obtained.

The phase modifier is included in the organic stripping agent to prevent the formation of multiple organic phases as the reagent formulation becomes enriched with zinc. The preferred phase modifier is a mixture of at least two alcohols, each of the alcohols selected from the group consisting of straight and branched chain alcohols containing from 9 to 11 carbon atoms. However, other commercially available chemicals which have been commonly used as phase modifiers in commercial systems, such as tributyl phosphate, isodecanol, p-nonylphenol, and 2-ethylhexanol, may also be used in the process of the invention.

The organic diluent to be used in this process must have a sufficiently high flash point to preclude potential explosion at the temperatures at which the process is carried out. Common organic diluents normally used in hydrometallurgy processes may have flash points below the elevated temperatures of the brines. Therefore, for safety reasons, the organic diluents must have a flash point above that at which the process of the present invention is practiced. It was found that an organic diluent having a low aromatic content, less than about 1%, was the preferred diluent for use in conjunction with the preferred 9 to 11 carbon chain alcohol phase modifier. This combination resulted in a formation of only one organic phase at high metal loading when the organic extraction solution of the present invention was contacted with the filtered brine.

In laboratory tests to evaluate the process of the present invention, a number of different extraction agents were tested to evaluate their potential for recovering zinc from synthetic brines containing a substantial quantity of metal ions in addition to the zinc ions. Included among the chemicals tested were napthenic acid, neo-decanoic acid, neo-pentanoic acid, dibutyl butyl phosphonate, Kelex 100, a trialkyl tertiary amine, and the methyl trialkyl quaternary amine of the present invention. Each of these extraction agents was tested in a extracting solution comprising 10% by volume of the extraction agent, 10% by volume of the Neodol 91, a As can be seen from Table I, only the tertiary amine, which was Adogen 383, a product of the Sherex Chemical Company, and the quaternary amine, Adogen 464, a product of the Sherex Chemical Company, obtained any appreciable zinc removal with the quaternary amine substantially out-performing the tertiary amine by extracting 97.6% of the zinc whereas the tertiary amine extracted only 51.9% of the zinc.

To verify the effectiveness of the methyl triakly quaternary amine chloride of the present invention in extracting zinc from geothermal brines, field tests were performed on a geothermal brine from the Imperial Valley of California in a mobile test laboratory. The extractant solution comprised a mixture of 10% by volume of a methyl trialkyl quaternary ammonium chloride with each of the alkyl groups having 8 to 10 carbon atoms, 10% by volume of Neodol 91, a mixture of 9 to 11 chain carbon alcohols, as the phase modifier, and 80% by volume of a commercially available mineral seal type oil, Tellura 705, with a flash point of more than 200 F. The brine was at a temperature of 160 F. when contacted with the organic extraction solution at a ratio of organic extraction solution to aqueous brine of 1 to 3. The results of the extraction for various metals in the brine are presented in Table II below.

TABLE II

METAL EXTRACTION FROM GEOTHERMAL BRINE
Aqueous/Organic Ratio = 3.1
Fresh Brine - 160 F.

| | Brine Connection | | | | | |
|---|---|---|---|---|---|---|
| | Initial | % | Final | % | Recovery | |
| Metal | (wppm) | err | (wppm) | err | % | err |
| Na | 59481 | 1.7 | 60794 | 0.2 | −1.8 | 1.7 |
| Ca | 32608 | 2.8 | 33042 | 1.5 | −1.3 | 3.2 |
| K | 17023 | 1.7 | 17501 | 0.2 | −2.8 | 1.7 |
| Fe | 2324 | 1.8 | 2278 | 1.2 | 2.0 | 2.1 |
| Mn | 1705 | 1.3 | 1709 | 0.6 | −0.2 | 1.4 |
| Zn | 714 | 1.6 | 101 | 2.4 | 85.9 | 2.2 |
| Sr | 592 | 3.3 | 595 | 1.1 | −0.6 | 3.5 |
| Ba | 263 | 5.4 | 267 | 4.2 | −1.7 | 6.9 |
| Li | 252 | 1.3 | 260 | 0.3 | −3.2 | 1.3 |
| Mg | 110 | 2.2 | 112 | 0.0 | −2.2 | 2.2 |

TABLE II-continued

METAL EXTRACTION FROM GEOTHERMAL BRINE
Aqueous/Organic Ratio = 3.1
Fresh Brine - 160 F.

| Metal | Brine Connection | | | | Recovery | |
|---|---|---|---|---|---|---|
| | Initial (wppm) | % err | Final (wppm) | % err | % | err |
| Pb | 157 | 14.6 | 147 | 7.6 | 6.1 | 16.3 |

These results demonstrate the effectiveness of the extraction process of the present invention for selectively recovering zinc from metal containing brines. Zinc recovery was 85.9%. The selectiveness of the process is verified by the fact that the only other metals removed during the zinc extraction were iron and lead at levels of 2% and 6.1% respectively. Therefore, the process of the present invention is capable of greater than 80% selective recovery of zinc from high solids brines, such as geothermal brine.

I claim:

1. A method of selectively extracting zinc from an aqueous brine containing zinc ions and a quantity of other metallic ions comprising calcium, iron or lead, comprising:
   a. contacting said aqueous brine with an organic reagent consisting essentially of an amine salt, a phase modifier, and an organic diluent so as to form a zinc amine complex whereby zinc in said brine is selectively extracted therefrom over said other metallic ions and transferred to the organic phase, said quaternary amine salt having the general formula

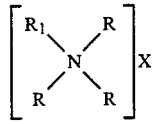

where R represents an alkyl hydrocarbon group containing from eight to ten carbon atoms, $R_1$ is methyl group, and X represents chloride ion; and
   b. contacting said zinc amine complex with an aqueous strippant comprising a neutral solution of sodium sulfate in water so as to form a sulfated quaternary amine salt whereby zinc in said zinc amine complex is stripped therefrom and tranferred to an aqueous phase thereby forming an aqueous zinc ion and chloride ion containing solution.

2. A method for selectively removing zinc from an aqueous brine as recited in claim 1 wherein said aqueous strippant comprises a solution of sodium sulfate in water having a sodium sulfate content of about 10% by weight.

3. A method for selectively removing zinc from an aqueous brine as recited in claim 1 wherein said phase modifier comprises an alcohol.

4. A method for selectively removing zinc from an aqueous brine as recited in claim 3 wherein said phase modifier comprises a mixture of at least two alcohols, each of said alcohols selected from the group consisting of straight and branched chain alcohols containing from nine to eleven carbon atoms.

5. A process for selectively removing zinc from an aqueous brine containing zinc ions and a quantity of other metallic ions comprising calcium, iron or lead, comprising:
   a. contacting said aqueous brine with an organic reagent consisting essentially of an amine salt, a phase modifier, and an organic diluent so as to form a zinc amine complex whereby zinc in said brine is selectively extracted therefrom over said other metallic ions and transferred to the organic phase, said quaternary amine salt having the general formula

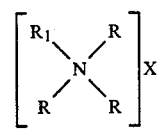

where R represents an alkyl hydrocarbon group containing from eight to ten carbon atoms, $R_1$ is methyl group, and X represents chloride ion;
   b. separating said zinc amine complex organic phase solution from said aqueous brine;
   c. contacting said zinc amine complex organic phase solution with an aqueous strippant comprising a neutral solution of sodium sulfate in water so as to form a sulfated quaternary amine salt organic phase solution and a zinc ion containing aqueous phase solution whereby zinc in said zinc amine complex is stripped therefrom and transferred from the organic phase to the aqueous phase;
   d. separating said sulfated quaternary amine salt organic phase solution from said zinc ion containing aqueous phase solution;
   e. recovering the zinc from said zinc ion containing aqueous phase solution;
   f. contacting said sulfated quaternary amine salt organic phase solution with aqueous chloride containing solution so as to transform the sulfated quaternary amine into a quaternary amine chloride in the organic phase and transfer the sulfate ions to the aqueous phase; and
   g. recycling said quaternary amine chloride organic phase solution from step (f) to step (a) as part of the amine salt comprising the organic reagent contacted with the aqueous brine in step(a).

6. A process for selectively removing zinc from an aqueous brine as recited in claim 5 wherein the zinc is recovered from said zinc ion containing aqueous phase solution by electrowinning.

7. A process for selectively removing zinc from an aqueous brine as recited in claim 5 wherein the zinc is recovered from said zinc ion containing aqueous phase solution by chemical precipitation.

* * * * *